United States Patent [19]

Preus

[11] 4,065,923
[45] Jan. 3, 1978

[54] BARRIER CONSTRUCTION FOR WATER CARRIED POLLUTANTS

[76] Inventor: Paul Preus, 21 Smith Road, Toms River, N.J. 08753

[21] Appl. No.: 729,713

[22] Filed: Oct. 5, 1976

Related U.S. Application Data

[63] Continuation-in-part of Ser. No. 676,794, April 14, 1976.

[51] Int. Cl.² ............................................. E02B 15/04
[52] U.S. Cl. ................................. 61/1 F; 210/DIG. 26
[58] Field of Search ..................... 61/1 F, 5; 114/.5 F; 210/43.5, 242, DIG. 26

[56] References Cited

U.S. PATENT DOCUMENTS

| | | | |
|---|---|---|---|
| 3,494,132 | 2/1970 | Logan | 61/1 F |
| 3,576,108 | 4/1971 | Rowland | 61/1 F |
| 3,708,982 | 1/1973 | Blockwick | 61/1 F |
| 3,868,824 | 3/1975 | Thurman | 61/1 F |

Primary Examiner—Dennis L. Taylor
Attorney, Agent, or Firm—Harold L. Stowell

[57] ABSTRACT

A barrier for water carried pollutants comprises a series of end to end connectable boom sections containing a floatable material which may comprise an oleophilic-hydrophobic-lighter than water composition which will selectively absorb hydrocarbons; fluid impervious connectors for the ends of the boom sections and flexible draft members and associated connectors for maintaining the integrity of the boom if it becomes necessary to replace one or more of the boom sections.

4 Claims, 3 Drawing Figures

BARRIER CONSTRUCTION FOR WATER CARRIED POLLUTANTS

CROSS-REFERENCE TO RELATED APPLICATIONS

This application is a continuation-in-part of application Ser. No. 676,794 filed Apr. 14, 1976.

Related subject material is disclosed in my U.S. patent application Ser. No. 497,712 filed Aug. 15, 1974 which is a continuation of application Ser. No. 292,886, now U.S. Pat. No. 3,855,152 which is a division of application Ser. No. 83,640 filed Oct. 24, 1970, now abandoned, and Ser. No. 676,795 filed Apr. 14, 1976.

Further related subject matter is disclosed in my U.S. Pat. Nos. 3,849,989; 3,667,235; 3,783,621 and 3,667,225.

BACKGROUND OF THE INVENTION

1. FIELD OF THE INVENTION

Floating barriers, known generally as oil booms, have been found to have great utility in containing and controlling oil slicks and other water carried pollutants on and in bodies of water. The barriers usually include floatation elements having a depending liquid impervious skirt which, when deployed around or in a controlling position relative to the pollutant, provide means to contain or prevent the pollutant from spreading or moving into uncontaminated areas.

2. SUMMARY OF THE INVENTION

This invention is directed to a barrier for containing and controlling water carried pollutants, for example, oil wherein the entire barrier is composed of a series of boom sections which are connectable in end to end relationship with each of the boom sections containing a floatation material which, for example, comprises an oleophilichydrophobic-lighter than water composition which will selectively absorb and/or adsorb hydrocarbons or other pollutants.

The boom sections are connected to flexible draft members such as cables or chains which maintain the intergrity of the boom even if it becomes necessary to replace one or more of the boom sections or to enlarge the area confined by the boom or to decrease such area by removing boom sections. In addition to the flexible draft members and associated connectors for maintaining the integrity of the boom, the invention provides for fluid impervious connectors which engage opposed boom section ends and prevent the escape of the contained floating substance at each joint or connection between boom sections.

The invention will be more fully described in light of the accompanying drawing wherein like components throughout the figures are indicated by like numerals and wherein:

DESCRIPTION OF PREFERRED EMBODIMENTS

Figure 1:
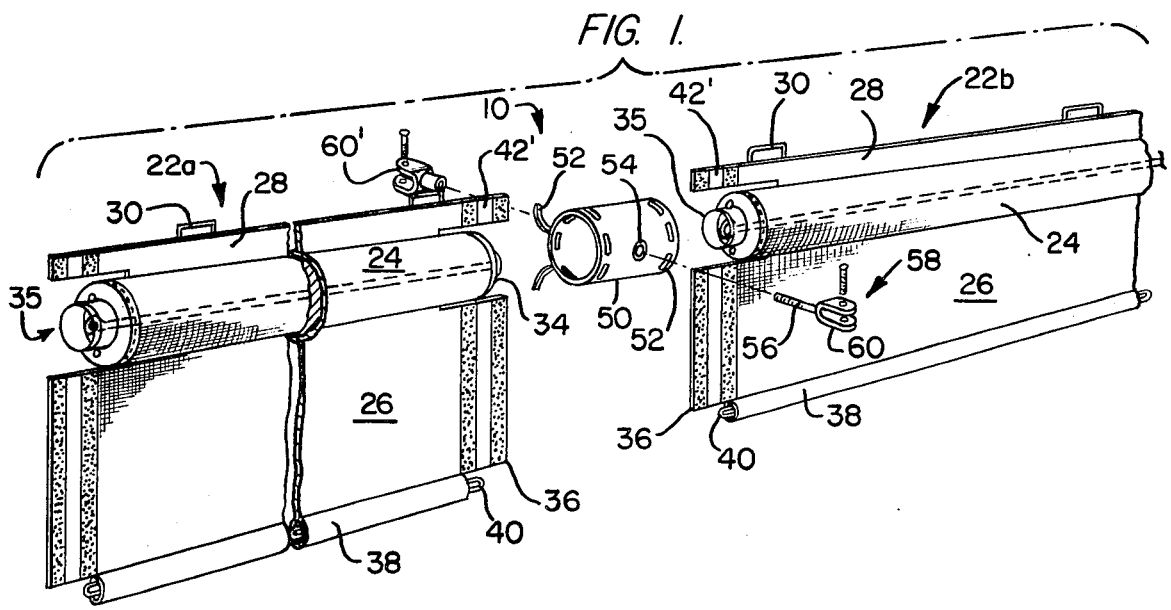
FIG. 1 is a perspective disassembled view of a pair of boom sections of the type wherein each of the floating booms includes a relatively long depending skirt.

Referring to FIGS. 1 through 3, 10 generally designates a floating oil containing boom of the invention.

The boom is made up of a plurality or series of boom sections 22a, 22b, 22c, etc. Each of the boom sections comprises a generally tubular element 24 and a depending skirt 26. The tubular sections 24 may be provided with an upstanding fin 28 provided with hand grips 30 at spaced intervals there along.

The handles or hand grips 30 are useful in deploying and retrieving the boom sections. Further, the handles 30 are also very useful in storing the boom sections as the handles may be merely slipped over pegs spaced at least a pair of handles distance or multiples thereof. The hand grips have also been found to be helpful in cleaning the boom sections prior to reuse as the handles may be hung over hooks movably positioned above a scrub tank.

The upstanding fin 28 is useful in reducing slopover of the hydrocarbons being contained within the boom by wind, currents and wave action.

Within the tubular portions 24 is maintained a suitable flotatable material 32 which in a preferred embodiment of this invention comprises "Sorbent C", an oleophilic-hydrophobic-lighter than water composition which will selectively absorb hydrocarbons floating on water. Such oleophilic-hydrophobic-lighter than water composition may comprise expanded pearlite 60–80% by weight; cellulose fibers 13–33% by weight; clays 4–8% by weight; and asphalt 1–5% by weight, all as more fully described in my U.S. Pat. No. 3,855,152 and my copending application Ser. No. 597,712 filed Aug. 15, 1974.

While "Sorbent C" is a preferred composition for filling the tubular portions 24, other suitable absorbents and/or absorbents may be used without departing from the scope of the present invention.

The cylindrical or tubular portions 24 of the boom sections 22a, 22b, 22c, etc. containing the selective oil absorbing and/or absorbing material are constructed of liquid pervious material such as mesh, which mesh may be formed of organic and/or inorganic fibers, plastic, metal or combinations thereof and one end of each of the tubular portions 24 is provided with a cylindrical end cover 34 and the other end is provided with a differently constructed end cover 35. The end covers 34 and 35 are attached such as by sewing to the tubular portion as shown. Where each of the tubular portions 24 of the boom is filled with a nonoil or hydrocarbon absorbent material such as foam plastic, cork or the like, then the material of construction of such tubular portions may be pervious or impervious, and a nylon reinforced, oil resistant fabric has been found to be very satisfactory.

Where desired, each of the boom segments 22a, 22b, 22c, etc. may include a depending skirt 26, which depending skirt is formed of a fluid impervious material such as sheet plastic or plastic or rubber coated fabrics which should be relatively inert to the solvent or softening action of hydrocarbons.

Where the skirt is employed, its length is greater than the length of the tubular portion 24 to provide overlapping portions 36 which may be fastened together by suitable separable fasteners, lacings or the like. Further, where such skirt is employed, the lower portion of the skirt is provided with a roll 38 containing a ballast chain or the like 40. The ends of the ballast chain 40, of opposed sections, are connected together by a through bolt (not shown).

Also as illustrated in FIG. 1, an upstanding fin 28 is provided for the boom, its length in a longitudinal direction is equivalent to the longitudinal length of the depending skirt to also provide overlap fastening ends 42' in a manner to the overlap ends 36 of the skirt 26.

Extending through each of the boom sections 22a, 22b, 22c, etc. is an interior wire, chain or cable 44 having eyes 46 at each end. The cable and eye may pass through the center of each of the boom sections 22a, 22b, 22c, etc.

The assembly also includes a fluid impervious draw tight cap generally designated 50 for each pair of boom sections. The draw tight cap 50 is provided with a draw string 52 at each end and intermediate the ends of the draw tight cap are grommets through which pass the shank 56 of connectors generally designated 58. The ends of the strings 52, may, if desired, be tied to adjacent handles 30 which would aid in preventing longitudinal movement of the cap 50. The grommets 54 are preferably made of a resilient material to provide an impervious seal between the shank 56 of connectors 58 to prevent hydrocabon leakage at the joints.

Each end of the connectors 58 is provided with a clevis 60 and 60' having a closure or connector bolt 62 between the furcations thereof. Each of the clevis connectors 60 and 60' receives between the furcations thereof a wire, chain or other flexible draft member 64 for clevis 60 and 64' for clevis 60'. The flexible draft members 64 and 64' extend the entire length of the boom and these members maintain the integrity of the boom even when one or more of the boom sections 22a, 22b, 22c, etc. is removed for replacement, enlargement or shortening of the entire boom 10. It will be noted that these cables, while being continuous, are made up of a plurality of lengths which are connected together.

Figure 2:
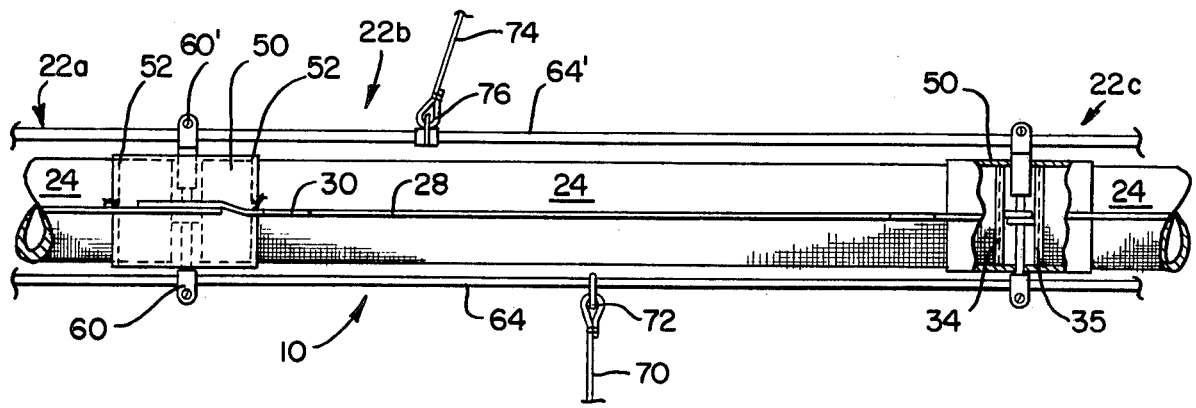
FIG. 2 is a top plan assembled view of the structures shown in FIG. 1.

It will be noted in FIG. 2 that means are shown for attaching anchor lines to the cables 64 and 64' where anchors are desired. In one form, anchor line or cable 70 is shown connected to cable 64 via a clevis type connector 72, similar to connectors 60. Using this type of connector, limited sliding motion is permitted between the connector 72 and the cable 64. Illustrated in respect to anchor line 74 is a form of connector 76 comprising a cable clamp so that no sliding motion exists between the cable 64' and the anchor line 74.

Figure 3:
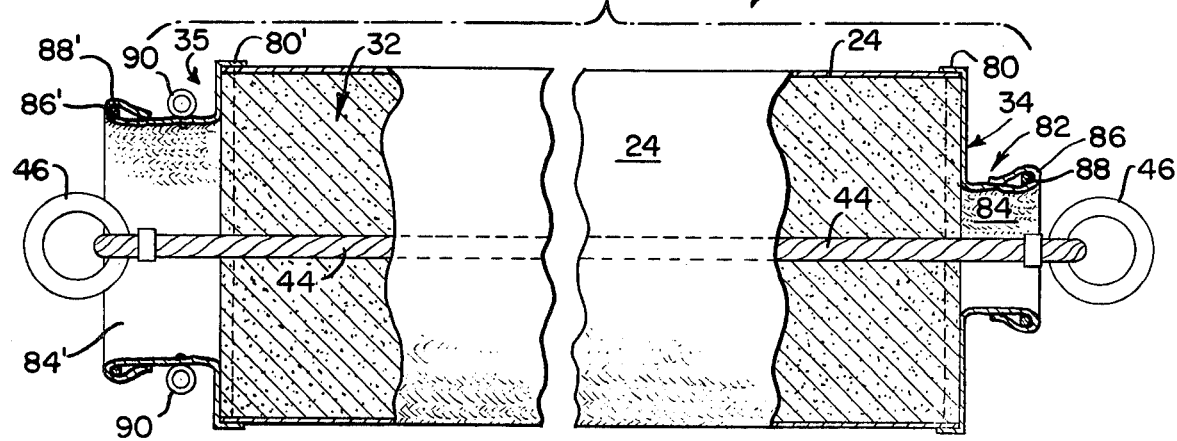
FIG. 3 is an enlarged, fragmentary top view of one boom section of the type shown in FIGS. 1 and 2.

The novel end covers 34 and 35 are more particularly shown in FIGS. 1 and 3. End cover 34 includes a band 80 which is stitched to the extended end of sleeve 24 or otherwise securely attached thereto. The center portion generally designated 82 of the end cover 34 is in the form of a tubular element 84 and its end is rolled as at 86 to provide for the reception of a draw string 88. The diameter of the tubular portion 84, when opened as illustrated in FIG. 3, is large enough to freely receive the eye or ring 46 therethrough. With the cable 44 inserted in the position illustrated in FIG. 3, the draw strings 88 are manipulated to close the opening in the tubular portion 84 securely about the cable 44 which stabilizes the position of the cable, the ring 46 and prevents granular or the like floatation material 32 from spilling from the tubular floatation element 24.

The opposite end cover 35, secured to the opposite end of the tubular portion 24, is also constructed of fabric, plastic and the like and is similar in construction to end cover 34 and includes a band 80 used to secure the end cover 35 to the tubular sleeve 24. The central portion of the end cover 35 includes a tubular portion 84' provided with a roll 86' adapted to receive a draw string 88'. The diameter of the tubular portion 84', when opened as illustrated in FIG. 3, is substantially larger in diameter than the major dimension of the ring 46 at that end of the cable 44. Further, the sleeve 84' may receive a pair or more of eyelets 90, two of which are shown in FIG. 3. The end cover 35 is provided with the larger diameter tubular portion 84' and the eyelets 90 to assist in filling the tubular floatation member 24 with the floatable material. For example, the tubular portion 84' is slipped over a filler tube and secured thereto by engaging the eyelets 90 and the ring 46 with hooks provided on the filler tube. When the sleeve 24 is filled to the proper capacity, the eyelets 90 are released from the hooks on the filler tube and the draw string 88' is manipulated to close the sleeve 84' about the cable 44 to prevent loss of granular or the like floatation material which, as hereinbefore set forth, may comprise an oleophilic-hydrophobic-lighter than water composition which will selectively absorb hydrocarbons floating on the water.

In the use of the hereinbefore described boom for containing, for example, oil spills on water, each of the boom sections 22a, 22b, 22c, etc. are brought to the site with the floatation tubular member 24 filled with a suitable floatation material or, for ease of transportation, the sections 22a, 22b, 22c, etc. may be transported to the site in a folded condition with the tubular portions 24 empty, in which situation the drawn strings 88' are released and the floatation material is emptied into each section to the desired density then the draw string 88' is tightened and tied securing the end closure 35 about the through cable 44. Once the boom sections are filled, a pair of flexible draft members 64 and 64' are deployed about the area to be confined by the boom and a first pair 22a and 22b of the boom sections are placed in the water between the pair of cables or the like 64 and 64'. The pair of boom sections are brought together and, where skirts and webs 26 and 28 are employed, the skirts are suitably connected as is the ballast chain 40 by a through bolt. Then the draw tight cap 50 is placed over each end of the pair of boom sections which have been brought together. A connector 58 with the internally threaded end 66 separated from the externally threaded end 68 is passed through the grommets 58, through each of the eyes 46 at the ends of cables 44 then the separated elements are reunited as shown in FIG. 2 of the drawing. With the connector halves 54 reunited and holding the pair of boom sections together, the bolts 62 are removed from the clevis ends 60 and 60' and the respective cables 64 and 64' are placed between the furcations thereof and the through bolts 62 are replaced. After this assembly, each of the draw strings 52 or 52', as the case may be, is securely tightened about its respective end of the booms and tied. This procedure is continued until the entire boom is assembled.

Any suitable form of cables 64 and 64' or chains can be used in the unit; however, in order to insure the integrity of the boom even in rivers which may contain floating debris such as trees, logs, etc., tensile strengths in the order of from about 4,000 to 8,000 pounds is desirable in the cables.

It has been found that the boom sections 22a, 22b, 22c, etc., having a length of about 5 feet and a diameter of about 8 inches, provides very satisfactory results. However, the length of each section may be from 2 feet to 100 feet and the diameter of each tubular section may be from 3 inches to as much as 36 inches. When the boom sections include depending skirts such as skirts 26, a skirt length of about 30 inches is satisfactory for open water containment and prevents underflow of oil in low and moderate water currents and skirt lengths of from 6 inches to more than 36 inches have been found to be useful.

Throughout the specification and in the drawings, the invention has been described as being deployed with a substantial freeboard; however, it will be recognized that in some cases the barrier may be anchored such that the top of the barrier is below the surface of the water, with, for example, the lower edge of the skirt on or adjacent to the bottom of the water body. Further, two or more barrier units may be assembled in stacked superposed relation.

One of the additional advantages of the present form of construction is that, if the skirt and/or tubular sleeve become worn or torn, the hardwear such as the cables 44, 64, 64', etc.; the connectors 56, etc. and chain 40, etc. may be reused with a new fabric sleeve and skirt.

Further, it will be appreciated by those skilled in the art that the absorbent or adsorbent material within each boom section may be readily replaced after the utility of the initial charge has been exhuasted.

What has been set forth above is intended as exemplary of the present invention to enable those skilled in the art to practice the invention and what is new and therefore desired to be protected by Letters Patent of the United States is.

I claim:

1. A barrier for water carried pollutants comprising a series of end to end connected boom sections, each of said boom sections comprising a hollow tubular sleeve containing a floatable material therein, said barrier characterized by a cable extending through each said sleeve and having an eye at each end externally of the ends of the sleeve, a separable connector passing transversely through and connecting the eyes of adjacent boom sections, said barrier further characterized by end covers for each end of the tubular sleeve of each section, each of the end covers including means securing the covers to the ends of the tubular sleeve and each said end covers including a longitudinally extending sleeve portion having a diameter large enough to freely pass the eyes of the cable extending through the hollow tubular flotable material receiving sleeve, and draw strings carried at each end of each sleeve portion whereby the end covers may be secured about the cable extending through the boom sections.

2. The invention defined in claim 1 wherein the diameter of the sleeve portion of the end cover at one end of the boom section is substantially larger than the diameter of the sleeve portion of the end cover at the other end of the boom section.

3. The invention defined in claim 2 wherein the sleeve portion having the larger diameter comprises a filling opening for the boom section.

4. The invention defined in claim 3 wherein the sleeve portion having the larger diameter has secured to its outer tubular surface at least a pair of hanger eyes.

* * * * *